(12) United States Patent
Cleere et al.

(10) Patent No.: US 11,449,359 B2
(45) Date of Patent: Sep. 20, 2022

(54) PRIORITIZED DATA OBJECT PROCESSING UNDER PROCESSING TIME CONSTRAINTS

(71) Applicant: Optum Services (Ireland) Limited, Dublin (IE)

(72) Inventors: David T. Cleere, Dublin (IE); Amanda McFadden, Donegal (IE); Barry A. Friel, Donegal (IE); William A. Dunphy, Dublin (IE); Christopher A. McLaughlin, Derry (IE)

(73) Assignee: Optum Services (Ireland) Limited, Dublin (IE)

( * ) Notice: Subject to any disclaimer, the term of this patent is extended or adjusted under 35 U.S.C. 154(b) by 231 days.

(21) Appl. No.: 16/900,078

(22) Filed: Jun. 12, 2020

(65) Prior Publication Data

US 2021/0389978 A1    Dec. 16, 2021

(51) Int. Cl.
*G06F 9/48* (2006.01)
*G06N 20/00* (2019.01)
(Continued)

(52) U.S. Cl.
CPC .......... *G06F 9/4881* (2013.01); *G06F 9/5038* (2013.01); *G06N 5/025* (2013.01); *G06N 20/00* (2019.01)

(58) Field of Classification Search
CPC ....... G06F 9/4881; G06F 9/5038; G06F 9/455
(Continued)

(56) References Cited

U.S. PATENT DOCUMENTS 8,185,899 B2 * 5/2012 Daly ..................... G06F 9/4881
                                                                  718/103
10,235,192 B2    3/2019 Hall et al.
(Continued)

OTHER PUBLICATIONS

International Searching Authority, International Search Report and Written Opinion for International Application No. PCT/US2021/033064, dated Aug. 2, 2021, (14 pages), European Patent Office, Rijswijk, Netherlands.
(Continued)

*Primary Examiner* — Andy Ho
(74) *Attorney, Agent, or Firm* — Alston & Bird LLP

(57) ABSTRACT

Systems and methods are configured to perform prioritized processing of a plurality of processing objects under a time constraint. In various embodiments, a priority policy that includes deterministic prioritization rules, probabilistic prioritization rules, and a priority determination machine learning model is applied to the objects to determine high and low priority subsets. Here, the subsets are determined using the deterministic prioritization rules and a probabilistic ordering of the low priority subset is determined using the probabilistic prioritization rules and the priority determination machine learning model. In particular embodiments, the ordering is accomplished by determining a hybrid priority score for each object in the low priority subset based on a rule-based priority score and a machine-learning-based priority score. An investigatory subset is then composed of the high priority subset and objects from the low priority subset added until a termination time according to a data processing model and the probabilistic ordering.

20 Claims, 8 Drawing Sheets

(51) Int. Cl.
 *G06F 9/50* (2006.01)
 *G06N 5/02* (2006.01)
(58) Field of Classification Search
 USPC .............................................. 718/103; 703/22
 See application file for complete search history.

(56) References Cited

U.S. PATENT DOCUMENTS

| | | | |
|---|---|---|---|
| 10,311,360 | B1 | 6/2019 | Ares |
| 10,452,674 | B2 | 10/2019 | Diwan et al. |
| 2007/0130215 | A1* | 6/2007 | Klein .................. G06F 16/2379 |
| 2011/0054925 | A1 | 3/2011 | Ghani et al. |
| 2016/0299788 | A1* | 10/2016 | Granshaw ........ G06Q 10/06312 |
| 2017/0372442 | A1 | 12/2017 | Mejias |
| 2019/0041830 | A1 | 2/2019 | Yarvis et al. |
| 2019/0095999 | A1 | 3/2019 | Li et al. |
| 2019/0155225 | A1 | 5/2019 | Kothandaraman et al. |
| 2019/0244149 | A1 | 8/2019 | Krishnaswamy |
| 2020/0065334 | A1 | 2/2020 | Rodriguez et al. |

OTHER PUBLICATIONS

Le Clair, Craig. "The ForresLer Wave™: Robotic Process Automation, Q2 2018," Forrester Research. Jun. 26, 2018, (24 pages).

* cited by examiner

PRIORITIZED DATA OBJECT PROCESSING UNDER PROCESSING TIME CONSTRAINTS

TECHNOLOGICAL FIELD

Embodiments of the present invention generally relate to automated systems and methods for investigating a listing of processing data objects.

BACKGROUND

Many industries are tasked with inspecting or auditing an inventory of items within a short timeframe. For instance, in many manufacturing environments, components used in manufacturing a product may need to be inspected prior to being used in production to ensure they are not defective. In some instances, every single component may need to be inspected before use. For example, microchips used in manufacturing smart phones may be considered to be a critical component and therefore, smart phone manufacturers may require every microchip to be inspected prior to being installed in a smart phone to ensure it is not defective. However, in many instances, the inspection of such components needs to be completed in a timely fashion so as not to hold up the manufacturing process.

In other industries, records used in running a business may need to be audited to ensure they are accurate. For example, for many insurance companies, insurance claims may need to be audited to identify those subject to overpayments. Here, the insurance company may wish to audit a high volume of claims because of the potential cost savings of identifying such claims. However, such audits may need to be done within a limited timeframe. For instance, the limited timeframe may be due to time constraint requirements to pay out on such claims so that the insurance company does not face potential fines.

However, many of the conventional processes for conducting such investigations operate on a first-in, first-out (FIFO) basis that is not conducive to optimizing the processes. For example, investigating items found in a certain inventory on a FIFO basis can lead to the investigation of many items that are not defective and therefore, not necessarily in need of investigation. In addition, these conventional processes are often times carried out under some type of constrained/limited capacity/resource. For example, many of these conventional processes are carried out manually and therefore personnel who are conducting the investigations can only investigate so many items within the time constraints placed on the processes. Thus, requiring personnel to work through items that do not necessarily need to be investigated can lead to a great deal of inefficient use of a limited resource. Although some conventional processes may make use of some form of high-level filtering to attempt to pare down the number of items that need to be investigated, these processes still often lead to high false positive rates and inefficiency. In addition, because time constraints are imposed on many conventional investigation processes, a thorough investigation on a particular item often times cannot be carried out.

Therefore, a need exists in the industry for improved systems and methods for conducting investigations of a group of items (e.g., inventory of items) conducted under a time constraint. More specifically, a need exists in the industry for better utilization of automation to improve accuracy and efficiency in conducting investigations of a group of items under a time constraint. It is with respect to these considerations and others that the disclosure herein is presented.

BRIEF SUMMARY

In general, embodiments of the present invention provide methods, apparatus, systems, computing devices, computing entities, and/or the like for performing prioritized processing of a plurality of processing objects under a processing time constraint. In various embodiments, a priority policy is applied to the plurality of processing objects to determine a high priority subset of the plurality of processing objects and a low priority subset of the plurality of processing objects. Generally speaking, a processing object is an electronic representation of an item on which an analysis is performed to identify whether the item is a member of a target group. For example, the processing objects may be electronic records of insurance claims in which an analysis is being performed to determine whether the claims are subject to overpayments.

Depending on the embodiment, the priority policy may include one or more deterministic prioritization rules, one or more probabilistic prioritization rules, and a priority determination machine learning model. In various embodiments, the deterministic prioritization rules and the probabilistic prioritization rules may be identified from a plurality of candidate prioritization rules. Here, in particular embodiments, a past investigatory success measure is determined for each of the candidate prioritization rules. Accordingly, the deterministic prioritization rules are identified as those candidate prioritization rules whose past investigatory success measures exceed a certainty threshold. While the probabilistic prioritization rules are identified as those candidate prioritization rules whose past investigatory success measures fall between the certainty threshold and a relevance threshold.

Accordingly, the high priority and low priority subsets may be determined using the one or more deterministic prioritization rules. For instance, in particular embodiments, the high priority subset includes each of the processing objects that satisfies at least one of the deterministic priority rules and the low priority subset comprises each of the processing objects that fails to satisfy any of the deterministic prioritization rules.

In addition, a probabilistic ordering of the low priority subset may be determined using the probabilistic prioritization rules and the priority determination machine learning model. Here, in particular embodiments, each of the probabilistic prioritization rules may be associated with a probabilistic weight value based on a past investigatory success measure for the corresponding rule. Accordingly, a hybrid priority score may be determined for each processing object in the low priority subset using a rule-based priority score for the processing object based on the probabilistic weight value for each probabilistic prioritization rule that is satisfied by the processing object and a machine-learning-based priority score determined for the processing object by using the priority determination machine learning model. In particular instances, the hybrid priority score may also be determined based on a valuation magnitude for the processing object.

An investigatory subset may then be composed from the high priority and low priority subsets. Accordingly, the investigatory subset may include each of the processing objects in the high priority subset. In addition, a data processing model may be used to add one or more of the processing objects found in the low priority subset to the investigatory subset in accordance with the probabilistic ordering of the subset until a termination time.

An investigatory output user interface may then be displayed in various embodiments that describes each processing object found in the investigatory subset. A secondary review of each of the processing objects found in the investigatory subset may then be conducted to determine whether to modify an adjustment subset to include the processing object. The processing objects found in the adjustment subset may then be adjusted to generate an examination data object describing the processing object that can be displayed on an examination user interface.

By enabling prioritized processing of data objects under processing time constraints, various embodiments of the present invention reduce the number of processing objects that need to be processed by data object processing systems during each processing iteration. This in turn reduces the computational load of data object processing systems while marginally affecting the effective throughput of these systems. Accordingly, by enabling prioritized processing of data objects under processing time constraints, various embodiments of the present invention enhance the efficiency and speed of various object processing systems and make important contributions to the various computational tasks that utilize real-time/expediated data processing.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION OF SOME EXAMPLE EMBODIMENTS

Figure 1:
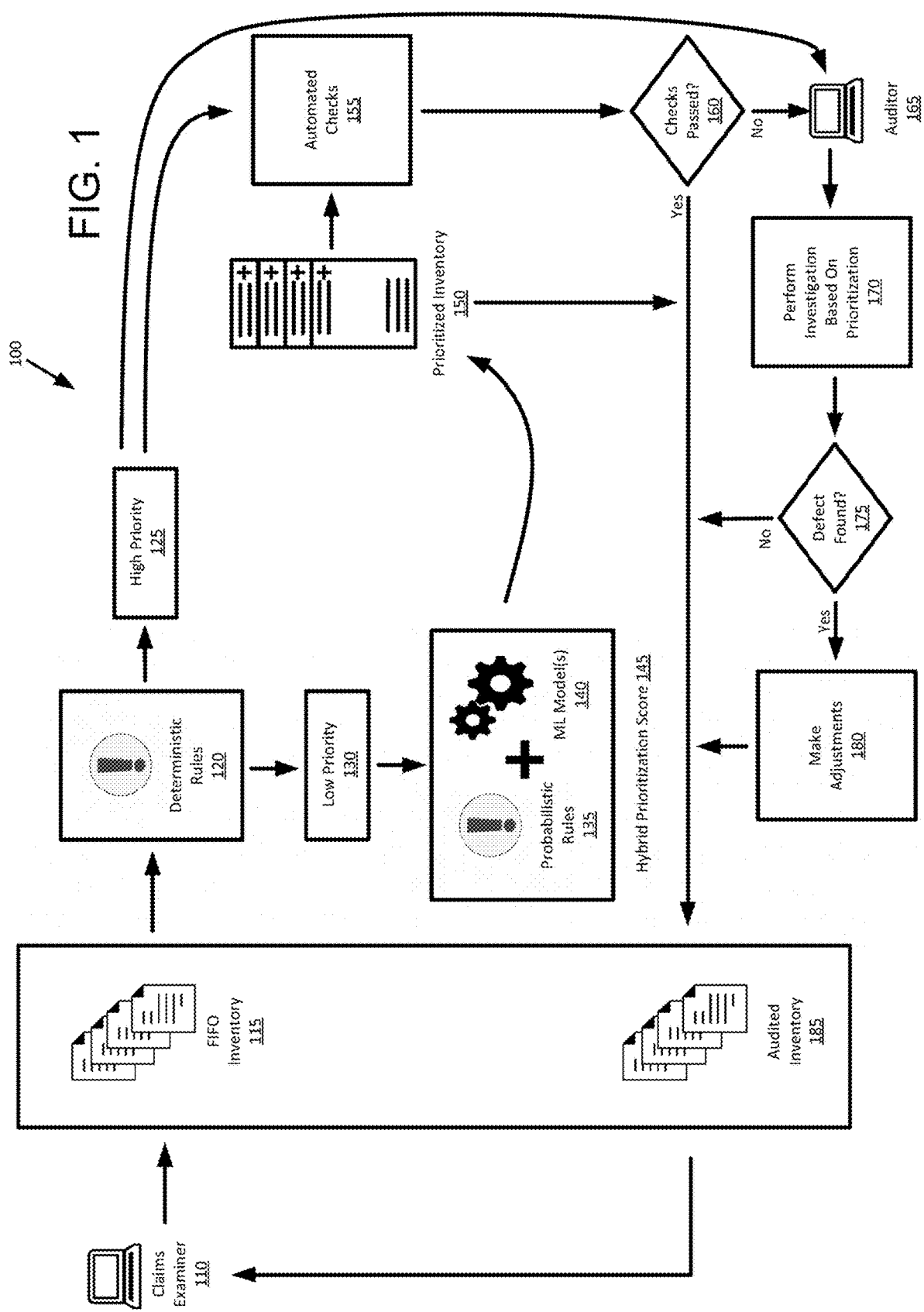
FIG. 1 is an overview process flow in accordance with various embodiments of the present invention.

Various embodiments of the present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. The term "or" (also designated as "/") is used herein in both the alternative and conjunctive sense, unless otherwise indicated. The terms "illustrative" and "exemplary" are used to be examples with no indication of quality level. Like numbers refer to like elements throughout.

Definitions of Certain Terms

The term "processing object" may refer to a data object that describes an item on which an analysis is performed in various embodiments to identify whether the item is a member of a target group. For instance, in particular embodiments, the item may be an insurance claim and the processing object may be an electronic record of the claim used in conducting an analysis to determine whether the claim may be subject to overpayment and need to be reviewed. While in other embodiments, the item may be a manufactured component and the processing object may be an electronic entry representing the component used in conducting an analysis to determine whether the component may have a defect and need to be inspected prior to shipment. Here, the processing object may be associated with a set of information that may be used in conducting the analysis. For example, the processing object for an insurance claim may include information on the medical procedure for which the claim is being submitted as well as information on the party submitting the claim. While the processing object for a manufactured component may include information recorded on the manufacturing conditions that were present when the component was assembled and/or tested properties of the component.

The term "processing time constraint" may refer to a data object that describes one or more limits placed on the amount of time allocated to handle a group of processing objects. For instance, a processing time constraint may be defined as a set timeframe (e.g., twenty-four hours) allowed for analyzing the group of processing objects to identify which of the objects are members of a target group, and if so, handle such object in an appropriate manner.

The term "deterministic prioritization rules" may refer to a data object that describes a set of rules used for separating a group of processing objects into high priority objects and low priority objects. For example, deterministic prioritization rules may represent various manufacturing rules used in sorting manufactured components into high priority objects that may have defects and low priority objects for inspection purposes.

The term "probabilistic prioritization rules" may refer to a data object that describes a set of rules used for arranging a group of processing objects in order of importance relative to each other with respect to a likelihood of being a member of a target group. For example, probabilistic prioritization rules may be used to prioritize a number of insurance claims for review that are subject to a time constraint so that the more important claims (e.g., claims that are more likely to be subject to overpayments) are reviewed first.

The term "priority determination machine learning model" may refer to a data object that describes parameters and/or hyper-parameters of one or more predictive models used in various embodiments for providing a probability for a processing object with respect to the object being a member of a target group. For example, in an insurance claims environment, the priority determination machine learning model may provide a probability that an insurance claim is subject to an overpayment.

The term "priority policy" may refer to a data object that describes a defined process for handling a group of processing objects with respect to prioritizing the processing of the objects. For instance, in particular embodiments, a priority policy may be made up of a combination of one or more deterministic prioritization rules, one or more probabilistic prioritization rules, and one or more priority determination machine learning models that are utilized in prioritizing objects to provide an order of importance for processing.

The term "investigatory output user interface" may refer to a data object that describes a user interface that can be used by individuals for viewing processing objects identified for investigation. For example, the investigatory output user interface may be used by individuals in particular embodiments to view processing objects for insurance claims that have been identified as subject to possible overpayments so that the claims can be investigated as to whether they are actually subject to overpayments.

The term "past investigatory success measure" may refer to a data object that describes a measure of an accuracy of a particular rule against historical cases with known outcomes. For instance, in particular embodiments, a past investigatory success measure may be a measure of how accurately a corresponding rule for the measure identifies processing objects are members of a target group.

The term "probabilistic weight value" may refer to a data object that describes a weighting that applies to a probabilistic prioritization rule. Here, in particular embodiments, the weighting may be determined based on a past investigatory success measure for the corresponding probabilistic prioritization rule.

The term "rule-based priority score" may refer to a data object that describes a value determined for a processing object based on the probabilistic weight values of one or more probabilistic prioritization rules that are satisfied by the processing object.

The term "machine-learning-based priority score" may refer to a data object that describes a value determined for a processing object using the priority determination machine learning model. For instance, in particular embodiments, this score represents a probability of the processing object being a member of a target group.

The term "valuation magnitude" may refer to a data object that describes a measure of the utility/economic value of a processing object. For example, the valuation magnitude may be a monetary value of the processing object. While in another example, the valuation magnitude may be a perceived importance of the processing object. For instance, the importance of a manufactured component used in assembling a larger component such as, the importance of defect-free brake rotors used in automobile production.

The term "certainty threshold" may refer to a data object that describes a threshold magnitude used for determining whether a candidate prioritization rule is defined as a deterministic prioritization rule. For instance, in particular embodiments, a candidate prioritization rule whom past investigatory success measure exceeds the certainty threshold may be defined as a deterministic prioritization rule. Here, the certainty threshold is used as a measure for determining whether a candidate prioritization rule should be defined as a deterministic prioritization rule based on how well the candidate prioritization rule accurately identifies processing objects are members of a target group.

The term "relevance threshold" may refer to a data object that describes a threshold magnitude used for determining whether a candidate prioritization rule is defined as a probabilistic prioritization rule. For instance, in particular embodiments, a candidate prioritization rule whom past investigatory success measure falls between the certainty threshold and the relevance threshold may be defined as a probabilistic prioritization rule. Similar to the certainty threshold, the relevance threshold is used as a measure for determining whether a candidate prioritization rule should be defined as a probabilistic prioritization rule based on how well the candidate prioritization rule accurately identifies processing objects are members of a target group. Although the candidate prioritization rule may not have a level of accuracy acceptable for being defined as a deterministic prioritization rule, the candidate prioritization rule may still have a level of accuracy acceptable for being defined as a probabilistic prioritization rule.

Overview of Various Embodiments of the Invention

An overview is now provided to demonstrate various embodiments of the invention. With that said, an example is now described that is used throughout the disclosure to demonstrate various embodiments of the invention. This example is provided to assist the reader in understanding these embodiments and should not be construed to limit the scope of the invention.

The example involves auditing an inventory of medical insurance claims with respect to payment integrity prior to pre-paying on the claims to ensure the claims are not subject to overpayments. The term "auditing" is used here to indicate that some type of analysis will be performed to identify those claims found in the inventory that are subject to overpayments. Overpayment on such claims can be a considerable cost to insurance companies and identifying claims subject to overpayments can drive significant annual savings for these companies. The conventional process for auditing these claims are the claims are investigated on a FIFO basis that can be susceptible to a number of limitations. First, the claims are often required to be investigated under a time constraint such as, for example, thirty-six hours. Second, the investigation is typically carried out using a limited resource. For example, many conventional processes used in investigating insurance claims involve manual intervention. Therefore, a limited resource becomes the auditors investigating the claims and their physical limitations of only being able to conduct investigations of so many claims under the time constraint. This can lead to auditors' inability to complete thorough investigation of these claims. Accordingly, various embodiments of the invention allow for optimization of how these claims are worked, resulting in reduced false positive rates, shortened turnaround times, and increased efficiencies and savings.

Although the example of auditing the health insurance claims to identify claims subject to overpayments is used throughout the disclosure to demonstrate various embodiments of the invention, those of ordinary skill in the art should recognize that the invention is also applicable to other environments involving the analyzing (e.g., the auditing or inspecting) of a plurality of items to identify those items that are members of a target group. For example, various embodiments of the invention may be used in a manufacturing environment to identify those components used in manufacturing a product that are defective from an inventory. Here, the components may be represented by processing objects that serve as electronic representations of the components that can be processed to identify which of the components in the inventory are likely to be defective. These components can then be sorted out for further inspection either manually or through automation.

For example, the steel industry many times uses some type of automated camera system for inspecting steel coils to identify coils with surface defects. In this example, various embodiments of the invention can be used in identifying which of the coils are likely to have surface defects based on analyzing processing objects providing information (values) on different variables experienced during the manufacturing of the coils such as, for example, rolling loads and temperatures that were present when the coils where manufactured from steel slabs. Here, various embodiments of the invention can allow for the identification of which coils are likely to have surface defects from the processing objects for the coils without the steel company having to actually inspect every single coil using the automated camera system. Those of ordinary skill in the art can envision other environments that various embodiments of the invention may be used in light of this disclosure.

Brief Overview of Technical Problem

Typically, investigative processes used in many industries are tasked with investigating (e.g., inspecting and/or auditing) an inventory of items daily that must be carried out within a short timeframe. Here, the term "inventory" generally refers to a plurality of items. Such investigative processes are often carried out to identify which items found in the inventory fall into a target group. For example, to identify which components found in an inventory of components for a manufacturing process are defective or which data records found in a registry used in an industry setting have inaccurate information recorded for the records. Identification of such items can lead to improved quality, higher efficiencies, and cost savings. However, current approaches are often manually driven and typically require human intervention to implement these investigative processes. In addition to being dependent on manual processes, existing solutions are also often dependent on the availability of some type of constrained capacity and/or limited resource such as personnel and/or inspection equipment and are subject to be completed under some type of time constraint.

Brief Overview of Technical Solution

Embodiments of the present invention provide concepts for replacing the existing manually driven processes of investigating (e.g., inspecting or auditing) items to identify those that fall into a target group with an automated process. In various embodiments, one or more deterministic prioritization rules are automatically applied to each of the items found in an inventory to sort the items into a set of items having a high priority for being investigated and a low priority for being investigated. The low priority items are then processed using one or more probabilistic prioritization rules and a weighting is assigned to each item according to the rules that apply to that item. In addition, one or more machine learning models are applied to each of the low priority items to identify a probability of the item being in the target group. A novel hybrid probability score is then determined for each of the low priority items based on both the weighting assigned to the item and the probability determined using the machine learning model(s). This hybrid probability score is used to prioritize the low priority items with respect to each other to provide an order of importance for investigation. The result is a listing of the items found in the inventory that provides a higher priority to items with a higher likelihood of being a member of the target group. As a result, the higher prioritized items are investigated earlier in the process, which is beneficial when time constraints are in place. In addition, many of the investigating processes may be automated to use the listing of prioritized items.

The disclosed solution is more effective, accurate, and faster than human investigation. Further, the deterministic prioritization rules, probabilistic prioritization rules, and machine learning model(s) can carry out complex mathematical operations that cannot be performed by the human mind (e.g., determining a likelihood of items being a member of a target group). Especially when such operations need to be performed in a short timeframe. Additionally, the solution eliminates the need to inspect/audit items that actually do not need inspection, makes more efficient use of constrained capacities and limited resources, and allows for more thorough investigation of items in a timely fashion.

Brief Overview of Various Embodiments

Turning now to FIG. 1, an overview process flow 100 is shown in accordance with various embodiments of the invention. The process flow 100 is discussed with respect to the example involving investigating an inventory of health insurance claims to identify those claims subject to overpayments. Again, the term "inventory" is used to simply refer to a plurality of health insurance claims. Here, the processing objects used in the investigation are electronic records representing the claims. Each of the records include various information on a claim such as, for example, the party submitting the claim, specifics on the party's insurance plan and coverage, the monetary value of the claim, the healthcare provider submitting the claim on behalf of the party, etc. Initially, each of the claims may be reviewed by a claims examiner 110 who determines the claim may be suspect and should be audited for potential overpayment. Therefore, the claims examiner 110 may place the claim into a specific inventory 115 for analysis.

Various embodiments of the invention are configured to prioritize the inventory of claims 115 based on the likelihood of overpayment using a combination of rules and one or more machine learning models. The prioritized inventory 150 is then processed using automation to perform an investigation on the inventory. Accordingly, any claim identified as suspect during the investigation is sent to an auditor 165 for review. Otherwise, review of the claim is completed, and the claim is automatically routed back to the originating claims examiner 110, bypassing the audit team for review. Here, the process flow 100 is being conducted under a processing time constraint that requires the inventory 115 to be investigated within a limited timeframe.

Therefore, in various embodiments, the claims placed in the inventory 115 are initially investigated via an automated process using a set of deterministic prioritization rules 120. Depending on the embodiments, these deterministic prioritization rules 120 may be identified using different criteria. However, in general, each of the deterministic prioritization rules 120 is ideally sufficient at identifying an insurance claim that is likely subject to an overpayment. For example, a deterministic prioritization rule 120 may be defined that if the claim is for a particular medical procedure to be performed by a particular healthcare provider, then the rule 120 applies to the claim. The reason for this particular deterministic prioritization rule may be that the healthcare provider has a past history of submitting claims for overpayment on the particular medical procedure.

In particular embodiments, the set of deterministic prioritization rules 120 may be developed from a set of candidate prioritization rules in which the deterministic prioritization rules 120 are identify as those rules with a past investigatory success measure over a certainty threshold. In general, the past investigatory success measure is a measure of an accuracy of a particular rule against historical cases with known outcomes. Therefore, in this example, the past investigatory success measure provides a measure of how accurately the corresponding candidate prioritization rule for the measure identifies an insurance claim that is subject to an overpayment.

Accordingly, the deterministic prioritization rules 120 are applied to each of the processing objects in the inventory 115 to sort the inventory 115 into a high priority list of claims 125 and a low priority list of claims 130. In particular embodiments, the claims found in the high priority list 125 are those claims identified as having a high likelihood to being subject to overpayments and therefore are given priority over the claims found in the low priority list 130. This helps to ensure the high priority claims are investigated for overpayments within the processing time constraint. In some instances, the claims found in the high priority list 125 may be prioritized relative each other so that the claims with higher importance (e.g., the claims of high monetary value) are processed first.

Next, the claims found in the low priority list 130 are prioritized to provide an order of importance relative to each other. Here, in particular embodiments, a set of probabilistic prioritization rules 135 are applied to each claim to identify those rules in the set of probabilistic prioritization rules 135 that are applicable to the claim.

Similar to the deterministic prioritization rules 120, the probabilistic prioritization rules 135 may be identified using different criteria. In addition, the set of probabilistic prioritization rules 135 may be based on a set of candidate prioritization rules in which the probabilistic prioritization rules 135 are identified as those rules with a past investigatory success measure over a relevance threshold. The relevance threshold is typically less than the certainty threshold used in identifying the deterministic prioritization rules 120. Therefore, candidate rules that do not necessarily have a past investigatory success measure that is high enough to be identified as a deterministic prioritization rule 120 may still be identified as a probabilistic prioritization rule 135. Again, the basis of the set of probabilistic prioritization rules 135 in various embodiments is a set of rules that have a certain level of success in identifying insurance claims subject to overpayments.

In various embodiments, a probabilistic weight value is also assigned to each of the probabilistic prioritization rules 135 that is based on the rule's past investigatory success measure. Accordingly, a rule-based priority score may be determined for each claim found in the low priority list 130 based on the probabilistic weight values of the probability prioritization rules 135 that are applicable to the claim. For example, the probabilistic weight values for the applicable rules 135 may be combined (e.g., added or multiplied together) to determine the rule-based priority score for a claim. In addition, one or more machine learning models 140 are used to produce a score for each claim found in the low priority list 130 identifying a probability of the claim being subject to an overpayment. As described in further detail herein, the one or more machine learning models 140 may be any number of different types of predictive models.

At this point, in particular embodiments, a hybrid prioritization score 145 is determined for each low priority claim by combining the claim's rule-based priority score and machine-learning-based probability score. Depending on the embodiment, a number of different formulas may be used in combining the two scores. For instance, in particular embodiments, the hybrid prioritization score 145 for each claim is determined by multiplying the rule-based priority score, the machine-learning-based probability score, and a valuation magnitude for the claim. The value magnitude provides a measure of the value of the claim. For example, the value magnitude may be the dollar amount of the payment on the claim.

The hybrid prioritization score is then used in various embodiments to construct a prioritized inventory 150 for the low priority claims. This prioritized inventory 150 provides a listing of the low priority claims in order of importance relative to each other. Here, the importance is associated with the likelihood the low priority claim is subject to an overpayment relative to the other low priority claims found in the prioritized inventory 150 and therefore, the importance of being investigated within the processing time constraint placed on the investigation process.

A number of automated checks 155 are then performed in various embodiments on the claims to identify those claims with issues that suggest the claims are likely subject to overpayments. In particular embodiments, these automated checks 155 may be in the form of one or more rules that are applied by some type of automation such as robotic process automation. Depending on the embodiment, the process flow 100 may be designed to have the automated checks 155 performed on both the high priority list of claims 125 and the low priority list of claims 130 as prioritized in the prioritized inventory 150 or just on the low priority list of claims 130. If both the high priority list of claims 125 and the low priority list of claims 130 are to have the automated checks 155 performed on them, then the high priority list of claims 130 are typically processed first before the prioritized inventory 150 for the low priority list of claims 130. This ensures the high priority claims are processed within the processing time constraint. However, in other instances, the high priority list of claims 125 may bypass the automated checks 155 and be sent directly to the auditors 165 for review.

Accordingly, the automated checks 155 are performed on the claims based on their prioritization to identify those claims that fail one or more of the checks and therefore, should be reviewed by the auditors 165. Therefore, the claims are selected from the prioritized inventory 150 based on their priority relative to one another. In particular embodiments, any claims not processed by the automated checks 155 within the processing time constraint are deprioritized and sent back to the claims examiners 110. Here, the deprioritized claims are considered in many instances to have lower probabilities of overpayment and/or lower values (e.g., dollar amounts).

For those claims processed by the automated checks 155, a determination 160 is made for each claim as to whether the claim passes the checks. A full review of the claim is completed and if no issues are found, then the claim is routed back to the originating claim examiner 110 as audited inventory 185 without any human intervention. That is to say, the claim is returned to the audited inventory 185, passing the need for auditor review.

However, if the automated checks 155 have identified a potential error on the claim, then the claim is sent to an auditor 165 for investigation. Here, the claim has only been partially reviewed and now requires an auditor 165 to complete the review before sending it back to the originating claims examiner 110. Here, the auditor 165 may conduct investigations of the claims that have failed one or more checks based on their prioritization 170. For example, in particular embodiments, the processing objects for the different claims that have failed the checks may be displayed on some type of user interface that allows the auditor 165 to review the information for the claims and conduct investigations by analyzing the information and/or accessing and analyzing additional information on the claims as needed. If a defect in a claim if found 175, then the claim may be adjusted accordingly 180. For example, the dollar amount of the claim may be adjusted or the claim may be marked for the claim examiner 110 to decline. At this point, the originating claim examiner 110 processes the claim according to the outcome of the investigation conducted on the claim and places the claim into the audited inventory 185.

Thus, various embodiments of the invention based on the process flow 100 shown in FIG. 1 allow for health insurance claims with a high likelihood of overpayments to be identified and worked as a priority. In addition, various embodiments allow auditors 165 more time to work on claims with a high chance of savings as compliant claims are automatically passed through the investigation process without any human intervention. This allows for increased claim volume that is likely subject to overpayment to be worked in a more efficient and effective manner.

Computer Program Products, Systems, Methods, and Computing Entities

Embodiments of the present invention may be implemented in various ways, including as computer program products that comprise articles of manufacture. Such computer program products may include one or more software components including, for example, software objects, methods, data structures, and/or the like. A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform. Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, and/or a report writing language. In one or more example embodiments, a software component comprising instructions in one of the foregoing examples of programming languages may be executed directly by an operating system or other software component without having to be first transformed into another form. A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid state drive (SSD), solid state card (SSC), solid state module (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present invention may also be implemented as methods, apparatus, systems, computing devices, computing entities, and/or the like. As such, embodiments of the present invention may take the form of a data structure, apparatus, system, computing device, computing entity, and/or the like executing instructions stored on a computer-readable storage medium to perform certain steps or operations. Thus, embodiments of the present invention may also take the form of an entirely hardware embodiment, an entirely computer program product embodiment, and/or an embodiment that comprises combination of computer program products and hardware performing certain steps or operations.

Embodiments of the present invention are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically configured machines performing the steps or operations specified in the block diagrams and flowchart illustrations. Accordingly, the block diagrams and flowchart illustrations support various combinations of embodiments for performing the specified instructions, operations, or steps.

Exemplary System Architecture

Figure 2:
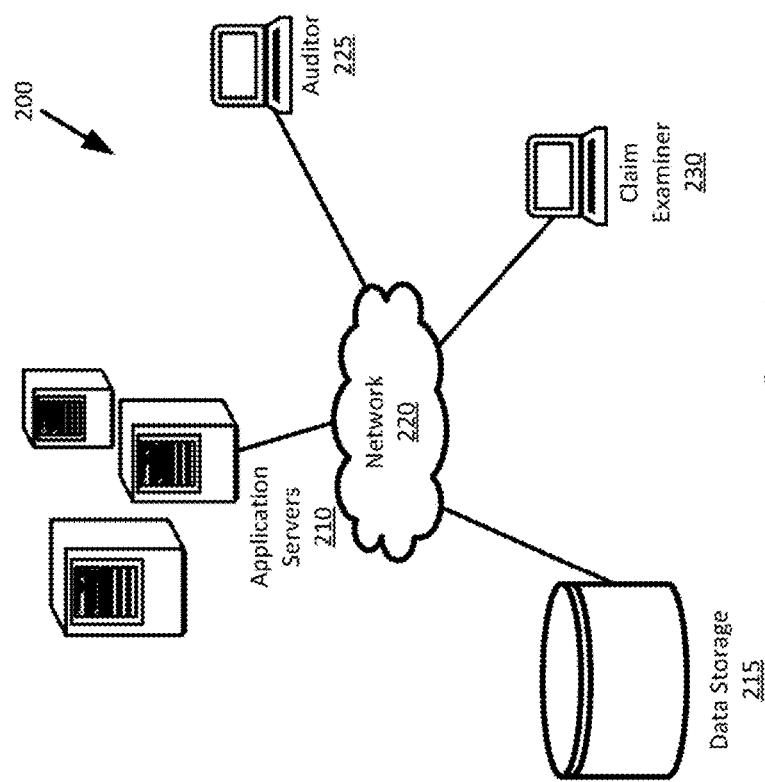
FIG. 2 is a diagram of a system architecture that can be used in conjunction with various embodiments of the present invention.

FIG. 2 provides an illustration of a system architecture 200 that may be used in accordance with various embodiments of the invention. Here, the architecture 200 includes various components for conducting investigations (e.g., inspections and/or audits) on various processing objects representing items that are to be identify as belonging or not to a target group. Accordingly, the components may include one or more application servers 210 and one or more data storage 215 in communication over one or more networks 220. It should be understood that the application server(s) 210 and data storage 215 may be made up of several servers, storage media, layers, and/or other components, which may be chained or otherwise configured to interact and/or perform tasks. Specifically, the application server(s) 210 may include any appropriate hardware and/or software for interacting with the data storage 215 as needed to execute aspects of one or more applications for conducting investigations of various processing objects representing items and handling data access and business logic for such. Furthermore, the data storage 215 may be a device or any combination of devices capable of storing, accessing, and retrieving data. For instance, depending on the embodiment, the data storage 215 may comprise any combination and number of data servers and data storage media in any standard, distributed, or clustered configuration. In various embodiments, the application server(s) 210 provide access control services in cooperation with the data storage 215 and are configured to generate content that may be displayed on one or more computing devices in an appropriate structured language such as, for example, Hypertext Markup Language ("HTML") and/or eXtensible Markup Language ("XML").

In addition, the architecture 200 may include one or more computing devices 225, 230 used by individuals to further conduct investigations on various processing objects for items. For example, the computing devices 225, 230 may be used by auditor(s) and claims examiner(s) in conducting investigations and viewing the results of investigations on claims identified as potentially subject to overpayments. Here, these devices 225, 230 may be one of many different types of devices such as, for example, a desktop or laptop computer or a mobile device such as a smart phone or tablet.

As noted, the application server(s) 210, data storage 215, and computing devices 225, 230 may communicate with one another over one or more networks 220. Depending on the embodiment, these networks 220 may comprise any type of known network such as a land area network (LAN), wireless land area network (WLAN), wide area network (WAN), metropolitan area network (MAN), wireless communication network, the Internet, etc., or combination thereof. In addition, these networks 220 may comprise any combination of standard communication technologies and protocols. For example, communications may be carried over the networks 220 by link technologies such as Ethernet, 802.11, CDMA, 3G, 4G, or digital subscriber line (DSL). Further, the networks 220 may support a plurality of networking protocols, including the hypertext transfer protocol (HTTP), the transmission control protocol/internet protocol (TCP/IP), or the file transfer protocol (FTP), and the data transferred over the networks 220 may be encrypted using technologies such as, for example, transport layer security (TLS), secure sockets layer (SSL), and internet protocol security (IPsec). Those skilled in art will recognize FIG. 2 represents but one possible configuration of a system architecture 200, and that variations are possible with respect to the protocols, facilities, components, technologies, and equipment used.

Exemplary Computing Entity

Figure 3:
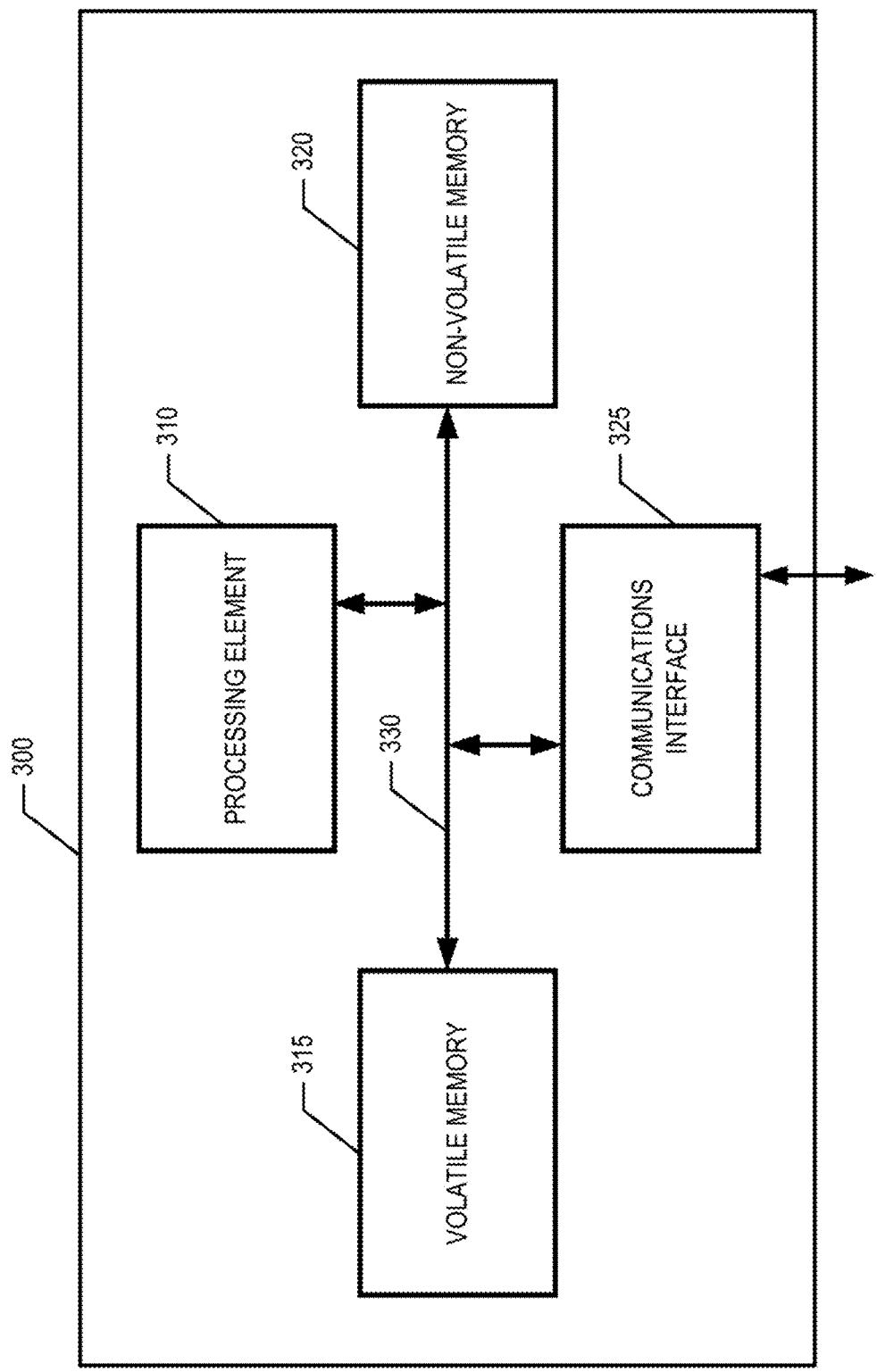
FIG. 3 is a schematic of a computing entity in accordance with various embodiments of the present invention.

FIG. 3 provides a schematic of a computing entity 300 according to various embodiments of the present invention. For instance, the computing entity 300 may be an application server 210 and/or computing devices 225, 230 found within the system architecture 200 previously described in FIG. 2. In general, the terms computing entity, entity, device, system, and/or similar words used herein interchangeably may refer to, for example, one or more computers, computing entities, desktop computers, mobile phones, tablets, phablets, notebooks, laptops, distributed systems, items/devices, terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably.

Although illustrated as a single computing entity, those of ordinary skill in the art should appreciate that the computing entity 300 shown in FIG. 3 may be embodied as a plurality of computing entities, tools, and/or the like operating collectively to perform one or more processes, methods, and/or steps. As just one non-limiting example, the computing entity 300 may comprise a plurality of individual data tools, each of which may perform specified tasks and/or processes.

Depending on the embodiment, the computing entity 300 may include one or more network and/or communications interfaces 325 for communicating with various computing entities, such as by communicating data, content, information, and/or similar terms used herein interchangeably that can be transmitted, received, operated on, processed, displayed, stored, and/or the like. For instance, the computing entity 300 may be an application server 210 communicating with other computing entities such as one or more devices 225, 230 being used by auditor(s) and/or claim examiner(s) and/or the like. Thus, in certain embodiments, the computing entity 300 may be configured to receive data from one or more data sources and/or devices as well as receive data indicative of input, for example, from a device.

As already mentioned, the networks used for communicating may include, but are not limited to, any one or a combination of different types of suitable communications networks such as, for example, cable networks, public networks (e.g., the Internet), private networks (e.g., frame-relay networks), wireless networks, cellular networks, telephone networks (e.g., a public switched telephone network), or any other suitable private and/or public networks. Further, the networks may have any suitable communication range associated therewith and may include, for example, global networks (e.g., the Internet), MANs, WANs, LANs, or PANs. In addition, the networks may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, satellite communication mediums, or any combination thereof, as well as a variety of network devices and computing platforms provided by network providers or other entities.

Accordingly, such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the computing entity 300 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra-wideband (UWB), infrared (IR) protocols, near field communication (NFC) protocols, Wibree, Bluetooth protocols, wireless universal serial bus (USB) protocols, and/or any other wireless protocol. The computing entity 300 may use such protocols and standards to communicate using Border Gateway Protocol (BGP), Dynamic Host Configuration Protocol (DHCP), Domain Name System (DNS), File Transfer Protocol (FTP), Hypertext Transfer Protocol (HTTP), HTTP over TLS/SSL/Secure, Internet Message Access Protocol (IMAP), Network Time Protocol (NTP), Simple Mail Transfer Protocol (SMTP), Telnet, Transport Layer Security (TLS), Secure Sockets Layer (SSL), Internet Protocol (IP), Transmission Control Protocol (TCP), User Datagram Protocol (UDP), Datagram Congestion Control Protocol (DCCP), Stream Control Transmission Protocol (SCTP), HyperText Markup Language (HTML), and/or the like.

In addition, in various embodiments, the computing entity 300 includes or is in communication with one or more processing elements 310 (also referred to as processors, processing circuitry, and/or similar terms used herein interchangeably) that communicate with other elements within the computing entity 300 via a bus 330, for example, or network connection. As will be understood, the processing element 310 may be embodied in several different ways. For example, the processing element 310 may be embodied as one or more complex programmable logic devices (CPLDs), microprocessors, multi-core processors, coprocessing entities, application-specific instruction-set processors (ASIPs), and/or controllers. Further, the processing element 310 may be embodied as one or more other processing devices or circuitry. The term circuitry may refer to an entirely hardware embodiment or a combination of hardware and computer program products. Thus, the processing element 310 may be embodied as integrated circuits, application specific integrated circuits (ASICs), field programmable gate arrays (FPGAs), programmable logic arrays (PLAs), hardware accelerators, other circuitry, and/or the like. As will therefore be understood, the processing element 310 may be configured for a particular use or configured to execute instructions stored in volatile or non-volatile media or otherwise accessible to the processing element 310. As such, whether configured by hardware, computer program products, or a combination thereof, the processing element 310 may be capable of performing steps or operations according to embodiments of the present invention when configured accordingly.

In various embodiments, the computing entity 300 may include or be in communication with non-volatile media (also referred to as non-volatile storage, memory, memory storage, memory circuitry and/or similar terms used herein interchangeably). For instance, the non-volatile storage or memory may include one or more non-volatile storage or memory media 320 such as hard disks, ROM, PROM, EPROM, EEPROM, flash memory, MMCs, SD memory cards, Memory Sticks, CBRAM, PRAM, FeRAM, RRAM, SONOS, racetrack memory, and/or the like. As will be recognized, the non-volatile storage or memory media 320 may store files, databases, database instances, database management system entities, images, data, applications, programs, program modules, scripts, source code, object code, byte code, compiled code, interpreted code, machine code, executable instructions, and/or the like. The term database, database instance, database management system entity, and/or similar terms used herein interchangeably and in a general sense to refer to a structured or unstructured collection of information/data that is stored in a computer-readable storage medium.

In particular embodiments, the memory media 320 may also be embodied as a data storage device or devices, as a separate database server or servers, or as a combination of data storage devices and separate database servers. Further, in some embodiments, the memory media 320 may be embodied as a distributed repository such that some of the stored information/data is stored centrally in a location within the system and other information/data is stored in one or more remote locations. Alternatively, in some embodiments, the distributed repository may be distributed over a plurality of remote storage locations only. As already discussed, various embodiments contemplated herein data storage 215 in which some or all the information/data required for conducting investigations on processing objects representing items may be stored.

In various embodiments, the computing entity 300 may further include or be in communication with volatile media (also referred to as volatile storage, memory, memory storage, memory circuitry and/or similar terms used herein interchangeably). For instance, the volatile storage or memory may also include one or more volatile storage or memory media 315 as described above, such as RAM, DRAM, SRAM, FPM DRAM, EDO DRAM, SDRAM, DDR SDRAM, DDR2 SDRAM, DDR3 SDRAM, RDRAM, RIMM, DIMM, SIMM, VRAM, cache memory, register memory, and/or the like. As will be recognized, the volatile storage or memory media 315 may be used to store at least portions of the databases, database instances, database management system entities, data, images, applications, programs, program modules, scripts, source code, object code, byte code, compiled code, interpreted code, machine code, executable instructions, and/or the like being executed by, for example, the processing element 310. Thus, the databases, database instances, database management system entities, data, images, applications, programs, program modules, scripts, source code, object code, byte code, compiled code, interpreted code, machine code, executable instructions, and/or the like may be used to control certain aspects of the operation of the computing entity 300 with the assistance of the processing element 310 and operating system.

As will be appreciated, one or more of the computing entity's components may be located remotely from other computing entity components, such as in a distributed system. Furthermore, one or more of the components may be aggregated and additional components performing functions described herein may be included in the computing entity 300. Thus, the computing entity 300 can be adapted to accommodate a variety of needs and circumstances.

Exemplary System Operation

The logical operations described herein may be implemented (1) as a sequence of computer implemented acts or one or more program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof. Greater or fewer operations may be performed than shown in the figures and described herein. These operations may also be performed in a different order than those described herein.

Inventory Sorting Module

Figure 4:
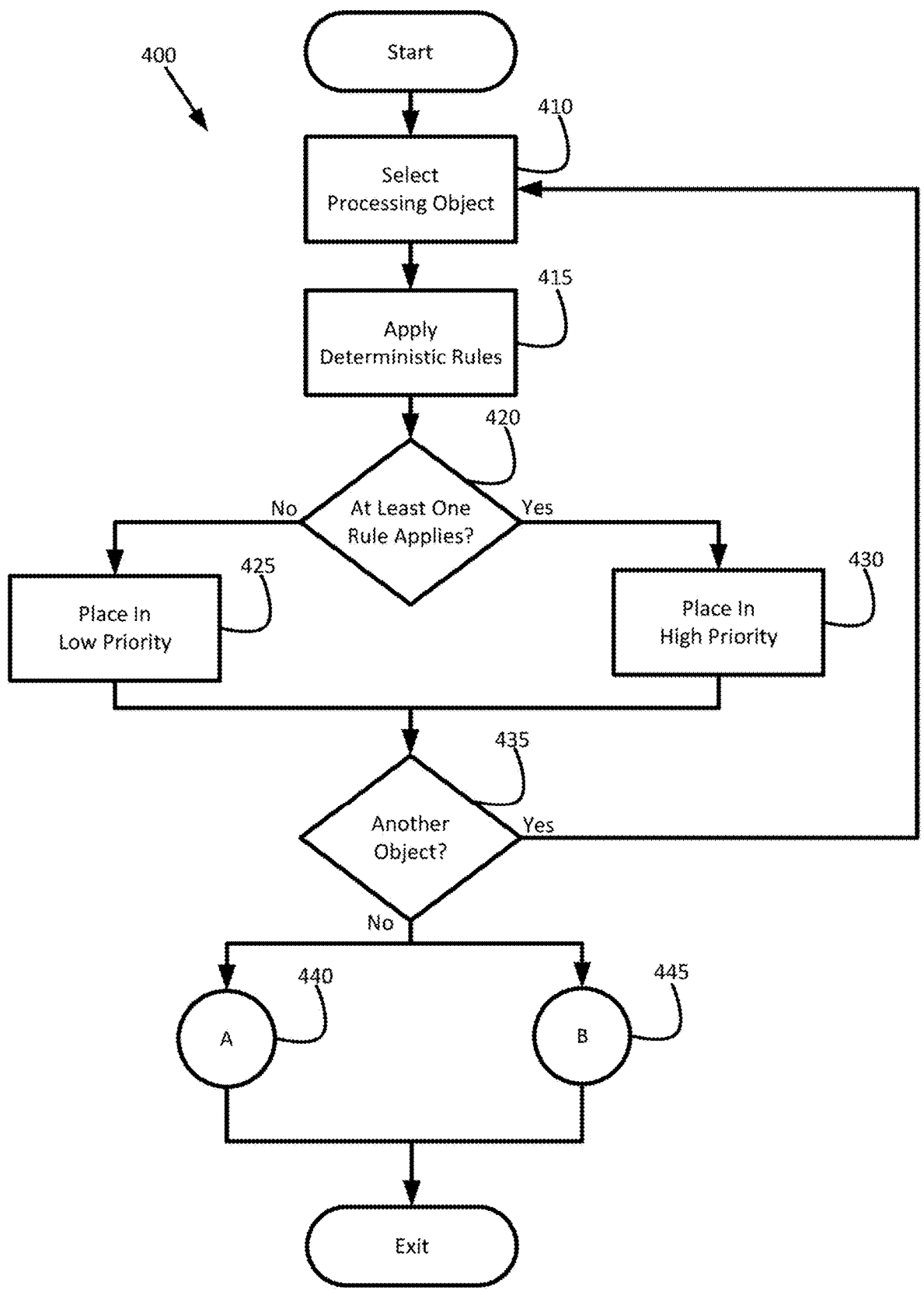
FIG. 4 is a process flow for sorting an inventory of processing objects in accordance with various embodiments of the present invention.

Turning now to FIG. 4, additional details are provided regarding a process flow for sorting an inventory of processing objects according to various embodiments. The term "inventory" is used to generally refer to a grouping/listing of processing objects. Here, FIG. 4 is a flow diagram showing an inventory sorting module for performing such functionality according to various embodiments of the invention. For example, the flow diagram shown in FIG. 4 may correspond to operations carried out by a processing element 310 in a computing entity 300, such as an application server 210 described in FIG. 2, as it executes the inventory sorting module stored in the computing entity's volatile and/or nonvolatile memory.

The process flow 400 shown in FIG. 4 begins in various embodiments with the inventory sorting module selecting a processing object from an inventory in Operation 410. In particular embodiments, the inventory sorting module may be configured to select the processing objects from the inventory one at time based on a FIFO based. While in other embodiments, the inventory sorting module may be configured to select the processing objects based on some type of criteria such as, for example, objects associated with a particular customer may be prioritized over objects for other customers found in the inventory.

Accordingly, the inventory sorting module applies one or more deterministic prioritization rules in Operation 415. As previously discussed, the deterministic prioritization rules in various embodiments involve rules that have a high degree of reliability in identifying which objects in the inventory are likely to be members of a target group. For instance, returning to the example, the deterministic prioritization rules may be those rules with a past investigatory success measure of identifying claims subject to overpayments over a certainty threshold.

The inventory sorting module determines in Operation 420 as to whether at least one of the deterministic prioritization rules applies to the process object. If none of the rules applies, then the inventory sorting module places the processing object in a low priority list in Operation 425. If a deterministic prioritization rule does apply (or required combination thereof), then the inventory sorting module places the processing object in a high priority list in Operation 430. Here, the two priority lists separate the processing objects found in the inventory into those objects with a high likelihood of being members of a target group (e.g., those insurance claims with a high likelihood of being subject to overpayments) and those objects with a low likelihood of being members of the target group.

At this point, the inventory sorting module determines whether another object is found in the inventory in Operation 435. If so, then the module returns to Operation 410 and selects the next processing object from the inventory. The inventory sorting module then repeats the operations just discussed to place the newly selected processing object on the low priority list or the high priority list.

Once the inventory sorting module has sorted all of the processing objects found in the inventory, the module prioritizes the processing objects found on the low priority list in Operation 440. Here, in particular embodiments, the inventory sorting module performs this operation by invoking a low-priority prioritization module and the low-priority prioritization module prioritizes the processing objects found on the low priority list relative each other with respect to an importance of being investigated. For instance, returning to the example, the claims found on the low priority list are prioritized relative to each other based on their likelihood of being subject to overpayments.

As previously detailed, in particular embodiments, the processing objects found on the high priority list may be immediately sent for investigation to determine if in fact they are members of the target group. For instance, in the example, the insurance claims found on the high priority list may be immediately sent to auditors to determine whether they are in fact subject to overpayments.

However, in other embodiments, the processing objects found on the high priority list may first be prioritized before being sent for investigation and/or may be further processed before being sent for investigation. Therefore, in particular embodiments, the inventory sorting module may be configured to prioritize the processing objects found on the high priority list in Operation 445. Again, the module performs this operation in particular embodiments by invoking a high-priority prioritization module. In turn, the high-priority prioritization module prioritizes the objects found on the high priority list relative to each other. However, as noted, the inventory sorting module may not be configured to perform this operation in particular embodiments. The module may be configured in this fashion because all of the processing objects found on the high priority list are likely to be investigated within the processing time constraint and therefore, there is no need to prioritize these objects.

Low-Priority Prioritization Module

Figure 5:
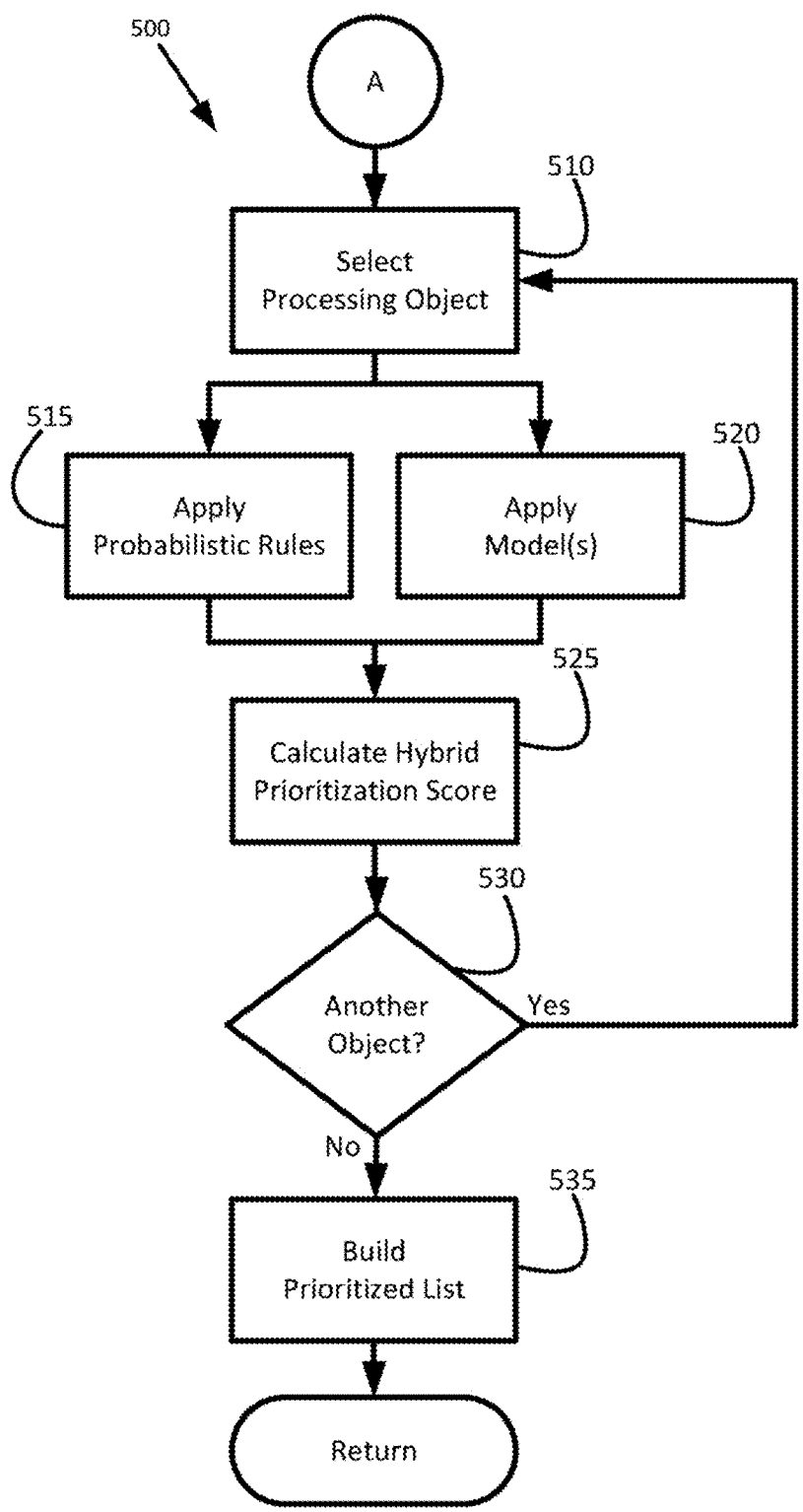
FIG. 5 is a process flow for prioritizing a set of low priority processing objects in accordance with various embodiments of the present invention.

Turning now to FIG. 5, additional details are provided regarding a process flow for prioritizing a set of low priority processing objects according to various embodiments. Here, FIG. 5 is a flow diagram showing a low-priority prioritization module for performing such functionality according to various embodiments of the invention. For example, the flow diagram shown in FIG. 5 may correspond to operations carried out by a processing element 310 in a computing entity 300, such as an application server 210 described in FIG. 2, as it executes the low-priority prioritization module stored in the computing entity's volatile and/or nonvolatile memory.

As previously mentioned, the low-priority prioritization module may be invoked by another module in various embodiments to prioritize a set of low priority processing objects. For instance, in particular embodiments, the low-priority prioritization module may be invoked by the inventory sorting module as previously described. However, with that said, the low-priority prioritization module may not necessarily be invoked by another module and may execute as a stand-alone module in other embodiments.

The process flow 500 begins with the low-priority prioritization module selecting a low priority processing object in Operation 510. As previously noted, the goal of prioritizing the low priority processing objects is to produce a prioritized listing of the objects so that the objects with a higher likelihood of being a member of the target group will be investigated before expiry of the time allocate for the investigation process.

Therefore, the low-priority prioritization module is configured in various embodiments to apply one or more probabilistic prioritization rules to the processing object in Operation 515. As previously mentioned, these rules may have a certain degree of reliability in identifying which objects in the inventory are likely to be members of a target group. Here, in particular embodiments, the probabilistic prioritization rules may have a past investigatory success measure over a relevance threshold.

Typically, the relevance threshold is less than the certainty threshold used in identifying the deterministic prioritization rules. Thus, a candidate rule that is selected to serve as a probabilistic prioritization rule may not have a certainty of identifying processing objects that are members of a target group that is acceptable to serve as a deterministic prioritization rule, but the rule still has a level of certainty that makes the rule useful as a probabilistic prioritization rule.

In addition, in particular embodiments, a probabilistic weight value is assigned to each probabilistic prioritization rule. This weight value may be based on the past investigatory success measure for the rule. Here, in particular embodiments, the low-priority prioritization module may be configured to combine (e.g., add or multiple) the probabilistic weight values of the probabilistic prioritization rules that are satisfied by the processing object to determine a rule-based priority score for the object.

The low-priority prioritization module also applies one or more machine learning models to the processing object in various embodiments to identify a probability of the object being a member of the target group in Operation 520. The one or more machine learning models may be designed to assign a probability to the object based on the likelihood of the processing object being a member of the target group. For example, in particular embodiments, the models may assign a machine-learning-based probability score between zero and one with respect to the object being a member of the target group. The closer the probability is to one, the more likely the object is a member of the target group. Examples of machine learning models that can be used to generate machine-learning-based probability scores include neural networks, support vector machines (SVMs), Bayes-ian networks, unsupervised machine learning models such as clustering models, and/or the like.

Once the low-priority prioritization module has applied the probabilistic prioritization rules and determined a rule-based priority score for the object and applied the one or more machine learning models to generate a machine-learning-based probability score indicating the likelihood of the processing object being a member of the target group, the module calculates a hybrid prioritization score in Operation 525.

Here, the low-priority prioritization module may calculate the hybrid prioritization score by combining the rule-based priority score and the machine-learning-based probability score. In addition, the low-priority prioritization module may include a valuation magnitude as a multiple. For instance, in particular embodiments, the low-priority prioritization module calculates the hybrid prioritization score by multiplying the rule-based priority score, the machine-learning-based probability score, and the valuation magnitude for the processing object. As previously noted, the valuation magnitude is a measure of value. For instance, in the example, the valuation magnitude for an insurance claim may be the dollar amount for the claim. Accordingly, the hybrid prioritization score may represent a more complete prioritization score that results in a more efficient and effective investigation process in various embodiments.

At this point, the low-priority prioritization module determines whether another low priority processing object exists in Operation 530. If so, then the module returns to Operation 510 and selects the next processing object. The low-priority prioritization module then repeats the operations just discussed for the newly selected low priority processing object.

Once all of the low priority processing objects have been processed, the low-priority prioritization module builds a prioritized list based on the hybrid prioritization scores for the objects in Operation 535. Accordingly, the prioritized list provides a listing of all of the low priority processing objects in order of importance relative to each other. The importance being a combination of the likelihood of the processing object being a member of the target group and the valuation magnitude of the object. Therefore, in the example, the importance is a combination of the likelihood the low priority insurance claim is subject to an overpayment and the dollar value of the claim.

The produced prioritized list of low priority processing objects can then be used to conduct the investigation of the processing objects found on the list. In general, the processing objects are selected off the list for investigation in order of importance. This allows for the objects with higher importance on the list be processed first so that such objects are likely investigated within the time constraint placed on conducting the investigation.

High-Priority Prioritization Module

Figure 6:
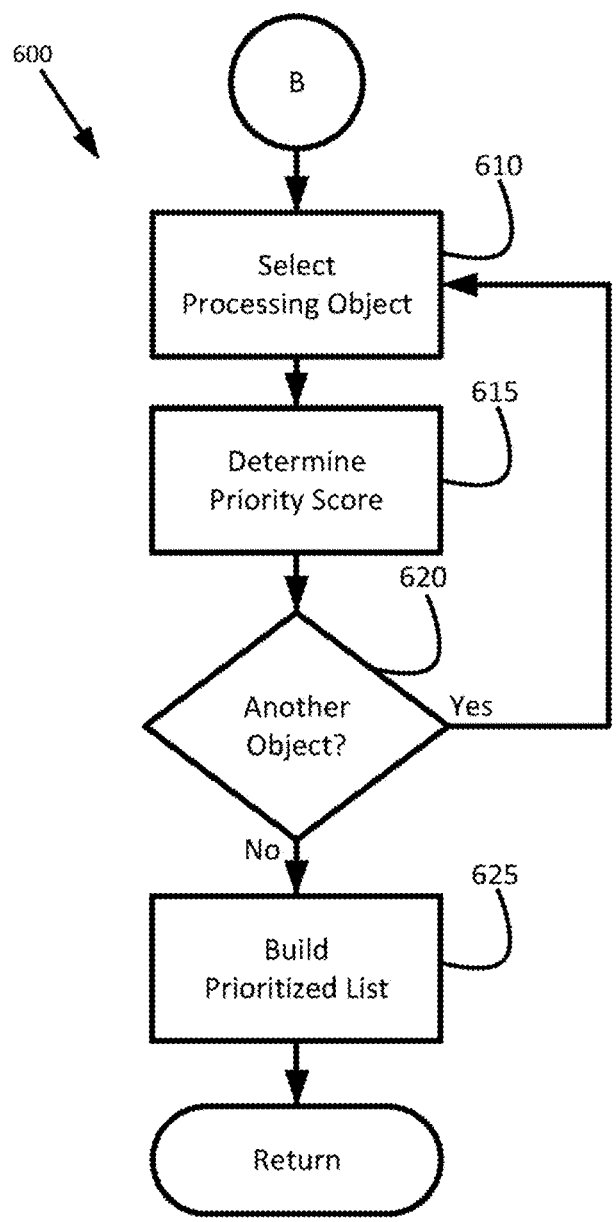
FIG. 6 is a process flow for prioritizing a set of high priority processing objects in accordance with various embodiments of the present invention.

As previously noted, the processing objects identified as high priority may also be prioritized in various embodiments. Therefore, turning now to FIG. 6, additional details are provided regarding a process flow for prioritizing a set of high priority processing objects according to various embodiments. Here, FIG. 6 is a flow diagram showing a high-priority prioritization module for performing such functionality according to various embodiments of the invention. For example, the flow diagram shown in FIG. 6 may correspond to operations carried out by a processing element 310 in a computing entity 300, such as an application server 210 described in FIG. 2, as it executes the high-priority prioritization module stored in the computing entity's volatile and/or nonvolatile memory.

As previously mentioned, the high-priority prioritization module may be invoked by another module in various embodiments to prioritize a set of high priority processing objects. For instance, in particular embodiments, the high-priority prioritization module may be invoked by the inventory sorting module as previously described. However, with that said, the high-priority prioritization module may not necessarily be invoked by another module and may execute as a stand-alone module in other embodiments.

The process flow 600 begins with the high-priority prioritization module selecting a high priority processing object in Operation 610. Once selected, the high-priority prioritization module determines a priority score for the object in Operation 615. Depending on the embodiment, the high-priority prioritization module may be configured to determine the priority score for the processing object using a number of different approaches.

For instance, in particular embodiments, the high-priority prioritization module may simply use a valuation magnitude for the processing object as the priority score for the object such as, for example, the dollar amount of an insurance claim. This approach allows for the high priority processing objects with the higher value to be processed first and thus, can lead to a higher value realization from the investigation if for some reason all of the high priority processing objects cannot be properly investigated within the time constraint. While in other embodiments, each of the deterministic prioritization rules may also be assigned a weighting similar to the probabilistic prioritization rules. Here, the high-priority prioritization module may determine the priority score for a high priority processing object in the same manner as the low-priority prioritization module calculates the rule-based priority score for a low priority processing object. While another approach may be for the high-priority prioritization module to determine a hybrid prioritization score similar to the low-priority prioritization module.

The high-priority prioritization module then determines whether another high priority processing object exists in Operation 620. If so, then the module returns to Operation 610 and selects the next processing object. The low-priority prioritization module then repeats the operations just discussed for the newly selected low priority processing object.

Once all of the high priority processing objects have been processed, the high-priority prioritization module builds a prioritized list based on the priority scores for the objects in Operation 625. Accordingly, the prioritized list provides a listing of all of the high priority processing objects in order of importance relative to each other. At this point, the prioritized list can be used to conduct the investigation of the high priority processing objects found on the list.

Object Investigation Module

Figure 7:
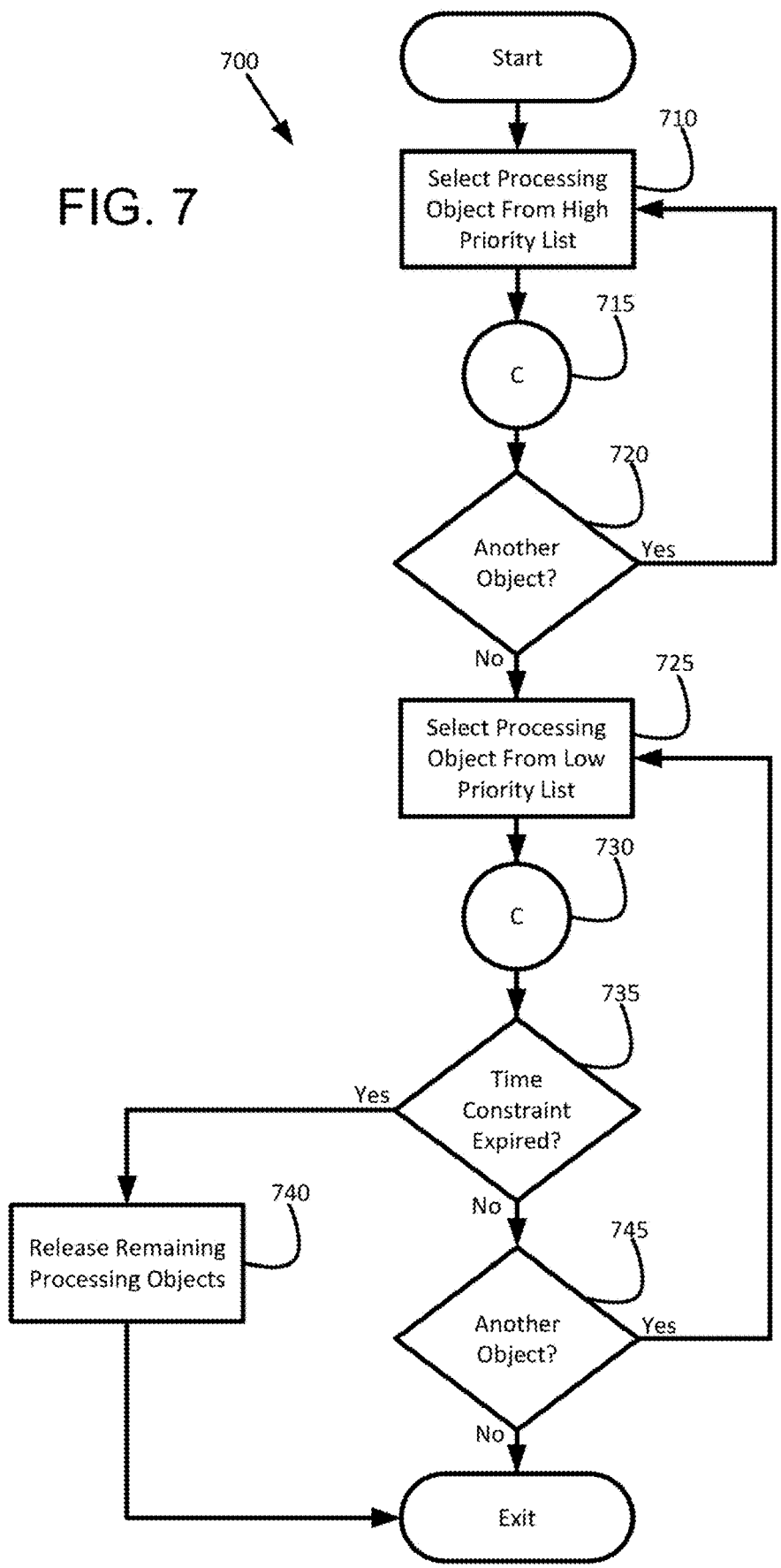
FIG. 7 is a process flow for investigating one or more prioritized lists of processing objects in accordance with various embodiments of the present invention.

Turning now to FIG. 7, additional details are provided regarding a process flow for investigating one or more prioritized lists of processing objects according to various embodiments. Here, FIG. 7 is a flow diagram showing an object investigation module for performing such functionality according to various embodiments of the invention. For example, the flow diagram shown in FIG. 7 may correspond to operations carried out by a processing element 310 in a computing entity 300, such as an application server 210 described in FIG. 2, as it executes the object investigation module stored in the computing entity's volatile and/or nonvolatile memory.

The process flow 700 shown in FIG. 7 begins in various embodiments with the object investigation module selecting a processing object from the high priority list in Operation 710. As previously noted, the processing objects identified as high priority may or may not be prioritized with respect to each other depending on the embodiment. In addition, the processing objects identified as high priority may simply be sent to an investigatory subset without further consideration in particular embodiments. For instance, returning to the example, the insurance claims identified as being high priority may simply be placed in an investigatory subset for auditors to investigate for overpayments without the claims being further filtered.

However, with that said, the high priority processing objects may be further filtered through automation in particular embodiments as demonstrated in the process flow 700 shown in FIG. 7. Here, the process flow 700 is configured to work through the list of high priority processing objects first before moving on to the prioritized list for the low processing objects. Such a configuration is used in various embodiments to ensure the high priority processing objects are properly investigated within the time constraint placed on the investigation process.

Therefore, the object investigation module performs one or more checks on the selected object in Operation 715. Here, the object investigation module performs this operation in particular embodiments by applying one or more rules to the processing object to identify whether any issues can be found with respect to the object that would warrant a further investigation (e.g., inspection or audit) to determine whether or not the object is actually a member of the target group. That is to say for the example, whether or not any issues can be found with respect to an insurance claim that would warrant having an auditor investigate the claim to determine whether or not the claim is actually subject to an overpayment.

The set of rules that are applied for the checks may be based on any number of different criteria and combination thereof. For instance, one or more of rules may be based on business criteria such as, for example, a combination of cost and insurance procedure found on a health insurance claim. One or more of the rules may be based on missing and/or suspect information associated with a processing object such as, for example, a missing vendor for a purchased component used in manufacturing. While one or more of the rules may be based on nonconformant variables associated with the processing object such as, for example, a nonconformant temperature at which a steel coil was hot rolled from a slab. Those of ordinary skill in the art can envision other criteria that may be used in defining the rules used in the checks depending on the environment in which the investigation is being conducted in light of this disclosure.

Once the object investigation module has checked the processing object to determine whether an issue exists warranting further investigation, the module determines whether another high priority processing object exists on the high priority list in Operation 720. If so, then the object investigation module returns to Operation 710, selects the next high priority processing object from the list, and performs the checks on the newly selected object.

The object investigation module then moves on to checking the low priority processing objects during the time remaining once all of the high priority processing objects have been checked. Accordingly, the object investigation module selects the first low priority processing object (e.g., the object with the highest priority) from the low priority list in Operation 725 and performs the one or more checks on the selected object in Operation 730. Again, the object investigation module performs this operation in particular embodiments by invoking the object investigation module.

Once the object investigation module has checked the low priority processing object, the module determines whether the time constraint has expired in Operation 735. If so, then the object investigation module is configured to release the remaining low priority processing objects from the low priority list in Operation 740. As a result, the deprioritized processing objects are marked as investigated (e.g., inspected or audited) and returned without further processing in particular embodiments. For instance, returning to the example, the low priority insurance claims are returned to the claims examiners as audited without having auditors review them (without any human intervention). Although the deprioritized processing objects have not been completely investigated, these objects often have lower probability of being a member of the target group and/or lower valuation magnitude since they are lower in the prioritization listing of the low priority objects.

If the time constraint has not expired, then the object investigation module determines whether another processing object is present on the low priority list in Operation 745. If so, then the object investigation module returns to Operation 730, selects the next processing object from the list, and performs the checks on the newly selected object. The process flow 700 ends once all of the low priority processing objects have been checked or the time constraint has expired.

Investigating a Selected Processing Object

Figure 8:
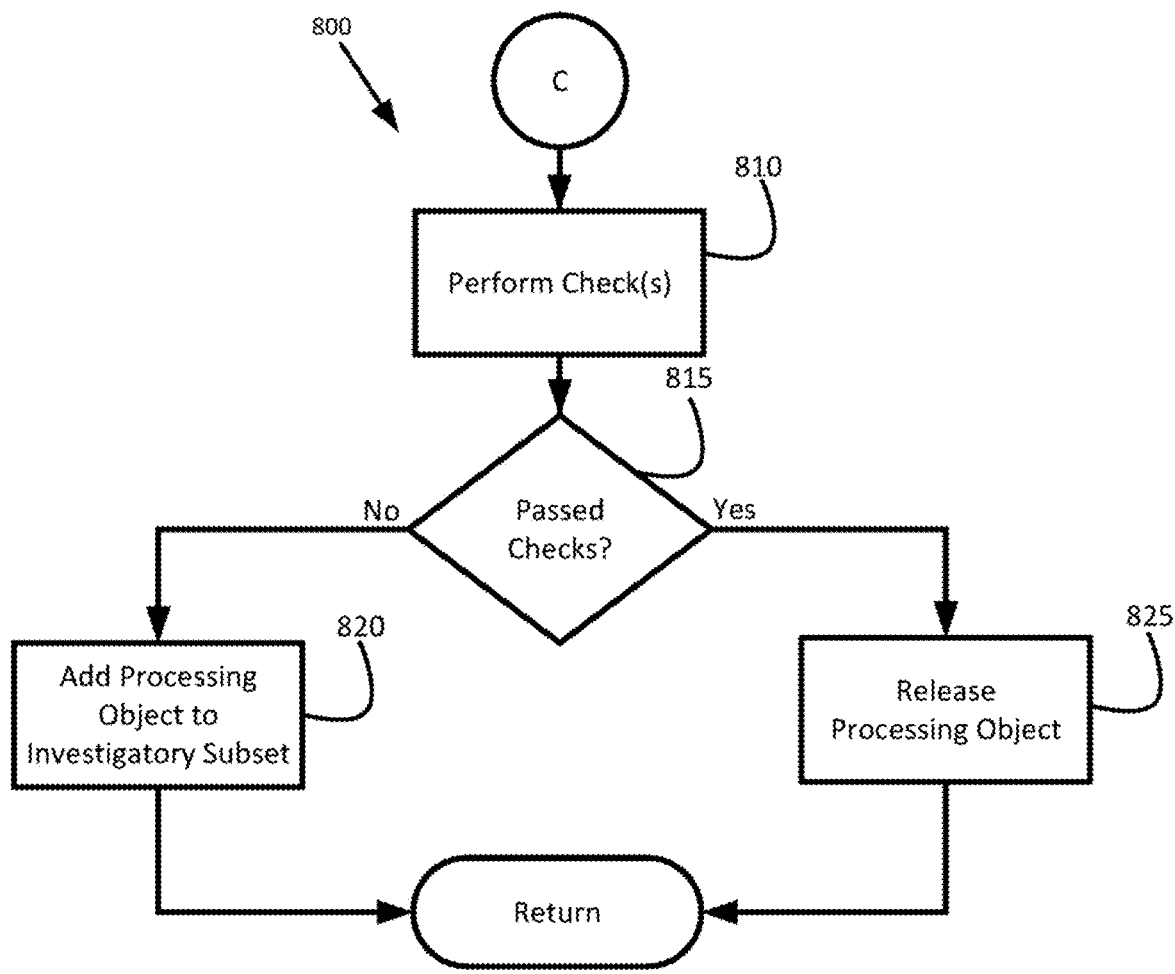
FIG. 8 is a process flow for investigating a particular processing object in accordance with various embodiments of the present invention.

Turning now to FIG. 8, additional details are provided regarding a process flow for investigating a selected processing object according to various embodiments. Here, FIG. 8 is a flow diagram showing an object investigation module for performing such functionality according to various embodiments of the invention. For example, the flow diagram shown in FIG. 8 may correspond to operations carried out by a processing element 310 in a computing entity 300, such as an application server 210 described in FIG. 2, as it executes the object investigation module stored in the computing entity's volatile and/or nonvolatile memory.

The process flow 800 shown in FIG. 8 begins in various embodiments with the object investigation module performing one or more checks on the processing object in Operation 810. As previously mentioned, these checks may include one or more rules that are applied to the processing object to determine whether an issue exists with respect to the object indicating that it is likely a member of the target group (e.g., the insurance claim is likely subject to an overpayment).

Therefore, the object investigation module determines whether the processing object has passed the checks in Operation 815. If not, then the object investigation module in particular embodiments places the processing object in an investigatory subset in Operation 820. As a result, a further investigation may be conducted on the processing object to determine whether it is actually a member of the target group.

For instance, in the example, an insurance claim placed in the investigatory subset may be reviewed by an auditor to determine whether the claim is actually subject to an overpayment. If the auditor determines the claim is subject to an overpayment, the claim can then be adjusted accordingly to address the overpayment. Thus, various embodiments of the invention allow for more claims with a high likelihood of overpayments to be worked as a priority. Furthermore, in particular instances, any adjustments needed to be made may be carried via an automated process to further minimize the auditor's involvement.

If the object investigation module instead determines the processing object has passed the checks, then the module in various embodiments releases the processing object in Operation 825, allowing it to bypass further investigation. For instance, in the example, if the insurance claim if found to have no issues, the claim is returned to the originating examiner without further review. As a result, the insurance claim is returned without having an auditor investigate the claim for overpayment. That is to say, the insurance claim is returned without having to use any of the auditor's value time. This provides the auditor with more time to work on other claims that are more likely to be subject to overpayments.

CONCLUSION

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A computer-implemented method for performing prioritized processing of a plurality of processing objects under a processing time constraint, the computer- implemented method comprising:
   applying a priority policy to the plurality of processing objects to determine a high priority subset of the plurality of processing objects and a low priority subset of the plurality of processing objects, wherein (i) the priority policy comprises one or more deterministic prioritization rules, one or more probabilistic prioritization rules, and a priority determination machine learning model, (ii) the high priority subset and the low priority subset are determined using the one or more deterministic prioritization rules, and (iii) a probabilistic ordering of the low priority subset is determined using the one or more probabilistic prioritization rules and the priority determination machine learning model;
   composing an investigatory subset comprising each of the processing objects in the high priority subset;
   until a termination time determined based on the processing time constraint and in accordance with the probabilistic ordering of the low priority subset:
      using a data processing model to determine whether to add a particular processing object in the low priority subset to the investigatory subset; and
      modifying the investigatory subset to add the particular processing object in response to determining to add the particular processing object to the investigatory subset; and
   providing an investigatory output user interface for display, wherein the investigatory output user interface describes each processing object found in the investigatory subset.

2. The computer-implemented method of claim 1, wherein the high priority subset comprises each of the processing objects of the plurality of processing objects that satisfies at least one of the one or more deterministic prioritization rules and the low priority subset comprises each of the processing objects of the plurality of processing objects that fails to satisfy any of the one or more deterministic prioritization rules.

3. The computer-implemented method of claim 1, wherein each of the one or more probabilistic prioritization rules is associated with a probabilistic weight value, and the method further comprises determining a hybrid priority score for each processing object in the low priority subset by:
   determining a rule-based priority score for the processing object based on the probabilistic weight value for each probabilistic prioritization rule of the one or more prioritization rules that is satisfied by the processing object;
   determining a machine-learning-based priority score for the processing object by using the priority determination machine learning model; and
   determining the hybrid priority score for the processing object based on the probabilistic weight value and the machine-learning-based priority score.

4. The computer-implemented method of claim 3, wherein each of the probabilistic weight values is based on a past investigatory success measure for the corresponding probabilistic prioritization rule.

5. The computer-implemented method of claim 3, wherein the hybrid priority score for the processing object is further based on a valuation magnitude for the processing object.

6. The computer-implemented method of claim 1, wherein determining the one or more deterministic prioritization rules and the one or more probabilistic prioritization rules comprises:
   identifying a past investigatory success measure for each of a plurality of candidate prioritization rules;
   determining the one or more deterministic prioritization rules based on a first subset of the plurality of candidate prioritization rules whose past investigatory success measures exceed a certainty threshold; and
   determining the one or more probabilistic prioritization rules based on a second subset of the plurality of candidate prioritization rules whose past investigatory success measures fall between the certainty threshold and a relevance threshold.

7. The computer-implemented method of claim 1, wherein each of the plurality of processing objects describes an examinable claim and the data processing model comprises an overpaid claim detection model.

8. The computer-implemented method of claim 1, further comprising:
   for each processing object in the investigatory subset, causing a secondary review of the processing object to determine whether to modify an adjustment subset to comprise the processing object;
   causing an adjustment of each processing object in the adjustment subset;
   subsequent to causing the adjustment of each processing object in the adjustment subset, generating an examination data object that describes each processing object in the adjustment subset; and
   causing display of an examination user interface that describes the examination data object.

9. An apparatus for performing prioritized processing of a plurality of processing objects under a processing time constraint, the apparatus comprising at least one processor and at least one memory including a computer program code, the at least one memory and the computer program code configured to, with the at least one processor, cause the apparatus to:
   apply a priority policy to the plurality of processing objects to determine a high priority subset of the plurality of processing objects and a low priority subset of the plurality of processing objects, wherein (i) the priority policy comprises one or more deterministic prioritization rules, one or more probabilistic prioritization rules, and a priority determination machine learning model, (ii) the high priority subset and the low priority subset are determined using the one or more deterministic prioritization rules, and (iii) a probabilistic ordering of the low priority subset is determined using the one or more probabilistic prioritization rules and the priority determination machine learning model;
   compose an investigatory subset comprising each of the processing objects in the high priority subset;
   until a termination time determined based on the processing time constraint and in accordance with the probabilistic ordering of the low priority subset:
      use a data processing model to determine whether to add a particular processing object in the low priority subset to the investigatory subset; and
      modify the investigatory subset to add the particular processing object in response to determining to add the particular processing object to the investigatory subset; and
   provide an investigatory output user interface for display, wherein the investigatory output user interface describes each processing object found in the investigatory subset.

10. The apparatus of claim 9, wherein the high priority subset comprises each of the processing objects of the plurality of processing objects that satisfies at least one of the one or more deterministic prioritization rules and the low priority subset comprises each of the processing objects of the plurality of processing objects that fails to satisfy any of the one or more deterministic prioritization rules.

11. The apparatus of claim 9, wherein each of the one or more probabilistic prioritization rules is associated with a probabilistic weight value, and the at least one memory and the computer program code are configured to, with the at least one processor, cause the apparatus to determine a hybrid priority score for each processing object in the low priority subset by:
   determining a rule-based priority score for the processing object based on the probabilistic weight value for each probabilistic prioritization rule of the one or more prioritization rules that is satisfied by the processing object;
   determining a machine-learning-based priority score for the processing object by using the priority determination machine learning model; and
   determining the hybrid priority score for the processing object based on the probabilistic weight value and the machine-learning-based priority score.

12. The apparatus of claim 11, wherein each of the probabilistic weight values is based on a past investigatory success measure for the corresponding probabilistic prioritization rule.

13. The apparatus of claim 11, wherein the hybrid priority score for the processing object is further based on a valuation magnitude for the processing object.

14. The apparatus of claim 9, wherein the at least one memory and the computer program code are configured to, with the at least one processor, cause the apparatus to determine the one or more deterministic prioritization rules and the one or more probabilistic prioritization rules by:

identifying a past investigatory success measure for each of a plurality of candidate prioritization rules;

determining the one or more deterministic prioritization rules based on a first subset of the plurality of candidate prioritization rules whose past investigatory success measures exceed a certainty threshold; and determining the one or more probabilistic prioritization rules based on a second subset of the plurality of candidate prioritization rules whose past investigatory success measures fall between the certainty threshold and a relevance threshold.

15. The apparatus of claim 9, wherein each of the plurality of processing objects describes an examinable claim and the data processing model comprises an overpaid claim detection model.

16. The apparatus of claim 9, wherein the at least one memory and the computer program code are configured to, with the at least one processor, cause the apparatus to:

for each processing object in the investigatory subset, cause a secondary review of the processing object to determine whether to modify an adjustment subset to comprise the processing object;

cause an adjustment of each processing object in the adjustment subset;

subsequent to causing the adjustment of each processing object in the adjustment subset, generate an examination data object that describes each processing object in the adjustment subset; and cause display of an examination user interface that describes the examination data object.

17. A non-transitory computer storage medium comprising instructions for performing prioritized processing of a plurality of processing objects under a processing time constraint, the instructions being configured to cause one or more processors to at least perform operations configured to:

apply a priority policy to the plurality of processing objects to determine a high priority subset of the plurality of processing objects and a low priority subset of the plurality of processing objects, wherein (i) the priority policy comprises one or more deterministic prioritization rules, one or more probabilistic prioritization rules, and a priority determination machine learning model, (ii) the high priority subset and the low priority subset are determined using the one or more deterministic prioritization rules, and (iii) a probabilistic ordering of the low priority subset is determined using the one or more probabilistic prioritization rules and the priority determination machine learning model;

compose an investigatory subset comprising each of the processing objects in the high priority subset;

until a termination time determined based on the processing time constraint and in accordance with the probabilistic ordering of the low priority subset:

use a data processing model to determine whether to add a particular processing object in the low priority subset to the investigatory subset; and modify the investigatory subset to add the particular processing object in response to determining to add the particular processing object to the investigatory subset; and provide of an investigatory output user interface for display, wherein the investigatory output user interface describes each processing object found in the investigatory subset.

18. The non-transitory computer storage medium of claim 17, wherein the high priority subset comprises each of the processing objects of the plurality of processing objects that satisfies at least one of the one or more deterministic prioritization rules and the low priority subset comprises each of the processing objects of the plurality of processing objects that fails to satisfy any of the one or more deterministic prioritization rules.

19. The non-transitory computer storage medium of claim 17, wherein each of the one or more probabilistic prioritization rules is associated with a probabilistic weight value, and the operations are further configured to determine a hybrid priority score for each processing object in the low priority subset by:

determining a rule-based priority score for the processing object based on the probabilistic weight value for each probabilistic prioritization rule of the one or more prioritization rules that is satisfied by the processing object;

determining a machine-learning-based priority score for the processing object by using the priority determination machine learning model; and determining the hybrid priority score for the processing object based on the probabilistic weight value and the machine-learning-based priority score.

20. The non-transitory computer storage medium of claim 19, wherein each of the probabilistic weight values is based on a past investigatory success measure for the corresponding probabilistic prioritization rule.

* * * * *

UNITED STATES PATENT AND TRADEMARK OFFICE
CERTIFICATE OF CORRECTION

PATENT NO. : 11,449,359 B2
APPLICATION NO. : 16/900078
DATED : September 20, 2022
INVENTOR(S) : Cleere et al.

It is certified that error appears in the above-identified patent and that said Letters Patent is hereby corrected as shown below:

In the Claims

Column 24
Line 32, "computer- implemented" should read --computer-implemented--

Signed and Sealed this
Twenty-fifth Day of October, 2022

*Katherine Kelly Vidal*

Katherine Kelly Vidal
*Director of the United States Patent and Trademark Office*